(12) United States Patent
Won et al.

(10) Patent No.: US 9,035,515 B2
(45) Date of Patent: May 19, 2015

(54) STRENGTH-REINFORCED SPINDLE MOTOR

(75) Inventors: Ilsik Won, Seoul (KR); Chanseok Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 340 days.

(21) Appl. No.: 13/168,527

(22) Filed: Jun. 24, 2011

(65) Prior Publication Data
US 2011/0316394 A1 Dec. 29, 2011

(30) Foreign Application Priority Data
Jun. 25, 2010 (KR) .................. 10-2010-0060421

(51) Int. Cl.
*H02K 7/08* (2006.01)
*H02K 5/16* (2006.01)
*G11B 19/20* (2006.01)

(52) U.S. Cl.
CPC ............ *H02K 5/163* (2013.01); *G11B 19/2009* (2013.01); *H02K 2205/03* (2013.01)

(58) Field of Classification Search
CPC .......... H02K 7/08; H02K 7/085; H02K 7/086
USPC ................ 310/89, 90, 91, 40 MM, 67 R, 425
See application file for complete search history.

(56) References Cited

U.S. PATENT DOCUMENTS

| | | | | |
|---|---|---|---|---|
| 5,143,459 A | * | 9/1992 | Plutt | 384/537 |
| 5,528,092 A | * | 6/1996 | Ohta | 310/67 R |
| 2008/0169709 A1 | * | 7/2008 | Lee | 310/42 |

FOREIGN PATENT DOCUMENTS

| | | |
|---|---|---|
| CN | 10-1340118 A | 1/2009 |
| CN | 10-1656442 A | 2/2010 |

OTHER PUBLICATIONS

Office Action dated Oct. 29, 2014 in Chinese Application No. 201110174581.7.

* cited by examiner

*Primary Examiner* — Michael Andrews
(74) *Attorney, Agent, or Firm* — Saliwanchik, Lloyd & Eisenschenk

(57) ABSTRACT

A spindle motor includes a bearing assembly, a base plate, a stator, a rotation shaft, a rotor, an adhesive member arranged at a space formed by the bearing assembly and a burring unit and a strength reinforcement member including a body fixed to a bottom surface of the base plate.

7 Claims, 5 Drawing Sheets

STRENGTH-REINFORCED SPINDLE MOTOR

CROSS-REFERENCE TO RELATED APPLICATION

This application claims the benefit under 35 U.S.C. §119 of Korean Patent Application No. 10-2010-0060421, filed Jun. 25, 2010, which is hereby incorporated by reference in its entirety.

BACKGROUND OF THE DISCLOSURE

1. Field of the Invention

The present disclosure relates to a spindle motor.

2. Description of the Related Art

Generally, a spindle motor is widely used as rotating means of a recording medium that requires a high speed rotation such as a hard disk drive or an optical disk drive (ODD). In order to rotate a disk at a high speed, the spindle motor includes a bearing housing including a bearing rotatably supporting a rotation shaft, and a base plate in which the bearing housing is secured.

The bearing housing of a spindle motor according to prior art is coupled to a burring unit formed at a base plate, and in a case a shock is applied to a floor surface of the bearing housing, the bearing housing is disadvantageously moved or disengaged from the base plate.

In a case the bearing housing is disadvantageously moved or disengaged from the base plate, a distance between a disk rotated by the spindle motor and an optical pick-up module is changed to generate an error on data reading or data writing.

BRIEF SUMMARY

The present disclosure is to provide a spindle motor configured to improve a coupling force between a bearing housing and a base plate to inhibit the bearing housing from being disengaged from the base plate.

Exemplary embodiments may, however, be implemented in many different forms and should not be construed as being limited to the embodiments set forth herein; Other features and advantages of the disclosed embodiments will be or will become apparent to one of ordinary skill in the art upon examination of the following figures and detailed description.

This Summary is provided to introduce, in a simplified form, a selection of concepts that will be further described below in the Detailed Description. This Summary is not intended to identify key features or essential features of the claimed subject matter, nor is it intended to be used to limit the scope of the claimed subject matter.

According to one aspect of the present disclosure, the object described above may be achieved by a spindle motor which comprises: a bearing assembly including a first floor plate, a first lateral plate extended from an upper edge of the first floor plate, a second lateral plate formed by being protruded from the first floor plate to a direction facing a bottom surface, a bearing housing including the second floor plate and a bearing formed with a rotation shaft hole by being accommodated in the bearing housing; a base plate formed with a burring unit coupled to a periphery of the first lateral plate; a stator including a core coupled to the periphery of the first lateral plate and a coil wound on the core; a rotation shaft inserted into the rotation shaft hole of the bearing; a rotor including a yoke coupled to the rotation shaft and a magnet arranged on the yoke to face the core; an adhesive member arranged at a space formed by the first floor plate, the second floor plate and the burring unit; and a strength reinforcement member including a body fixed to a bottom surface of the base plate, and a strength reinforcement unit whose one part is extended from the body into the space to be arranged inside the adhesive member.

In another general aspect of the present disclosure, the object described above may be achieved by a spindle motor including a bearing assembly, a base plate, a stator and a rotor, the spindle motor comprising: an adhesive member interposed between the bearing assembly and the base plate; and a strength reinforcement member arranged inside the adhesive member.

The spindle motor according to the present disclosure has an advantageous effect in that a strength reinforcement member is arranged inside an adhesive member fixing a bearing housing and a burring unit of a base plate, and a body integrally formed with the strength reinforcement member is arranged at a bottom surface of the base plate to inhibit the bearing housing from being move or disengaged from the burring unit even if a shock is applied to the bearing housing from outside.

DETAILED DESCRIPTION

Figure 1:
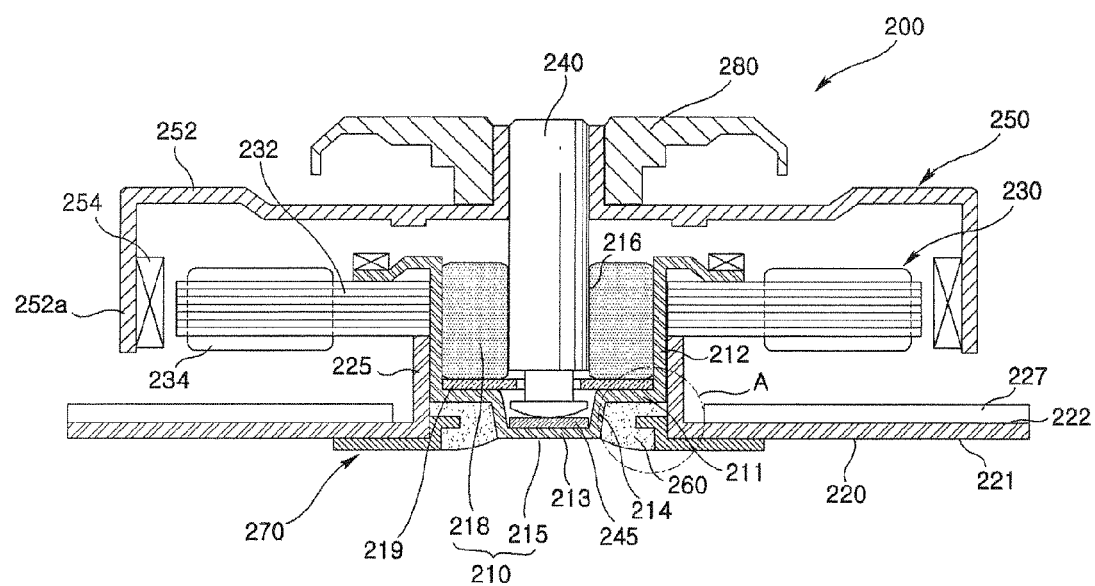
FIG. 1 is a cross-sectional view of a spindle motor according to an exemplary embodiment of the present disclosure.

Hereinafter, exemplary embodiments of the present disclosure will be described in detail with reference to the accompanying drawings. The following embodiments are provided as an illustration to fully convey the spirit of the present disclosure to those skilled in the art. Thus, the present disclosure is not limited to the embodiments which will be described below, but may be implemented in other forms.

The terms of "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, in the drawings, the size and relative sizes of layers, regions and/or other elements may be exaggerated or reduced for the sake of convenience and clarity. Like numbers refer to like elements throughout and explanations that duplicate one another will be omitted.

Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

As may be used herein, the term "substantially" provides an industry-accepted tolerance for its corresponding term and/or relativity between items. Such an industry-accepted tolerance ranges from less than one percent to ten percent and corresponds to, but is not limited to, component values, angles, et cetera. As may be used herein, the singular forms "a," "an" and "the" are intended to include the plural forms as well, unless the context clearly indicates otherwise.

Figure 2:
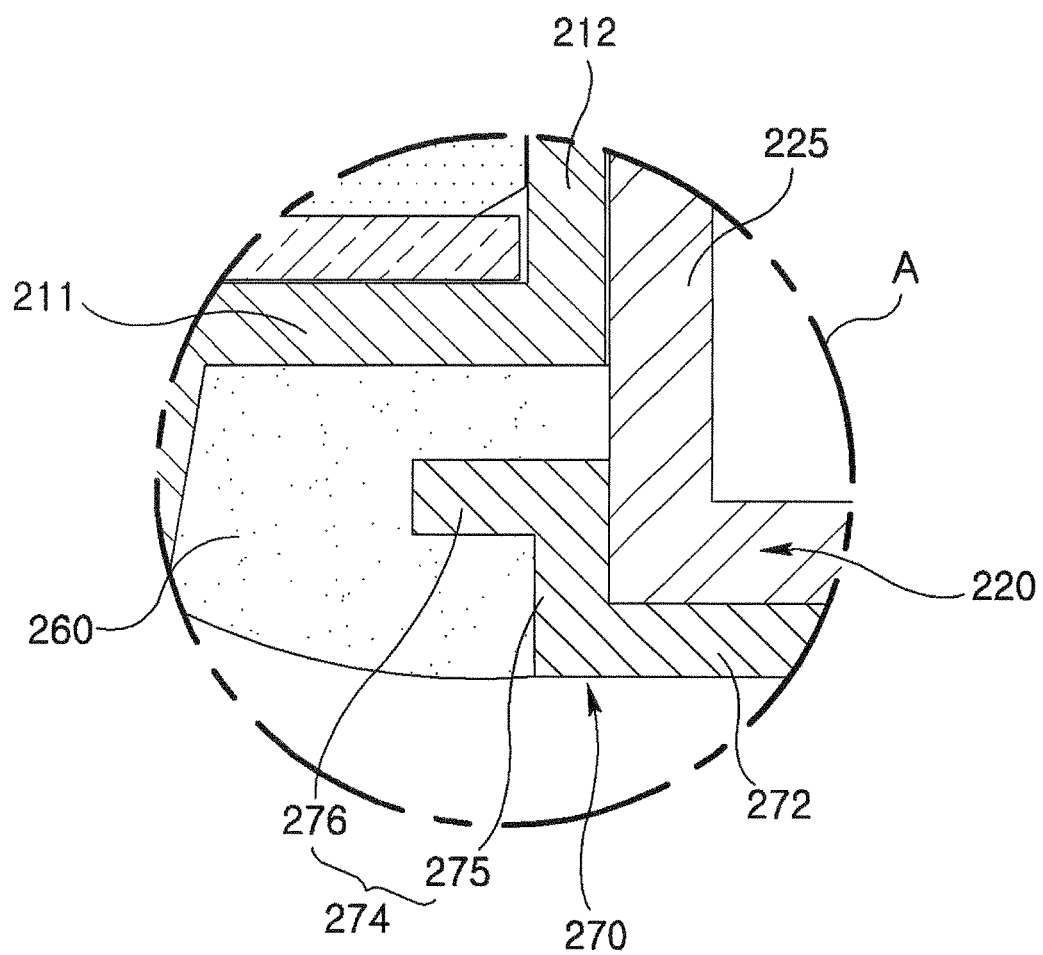
FIG. 2 is an enlarged view of 'A' part in FIG. 1.
Figure 3:
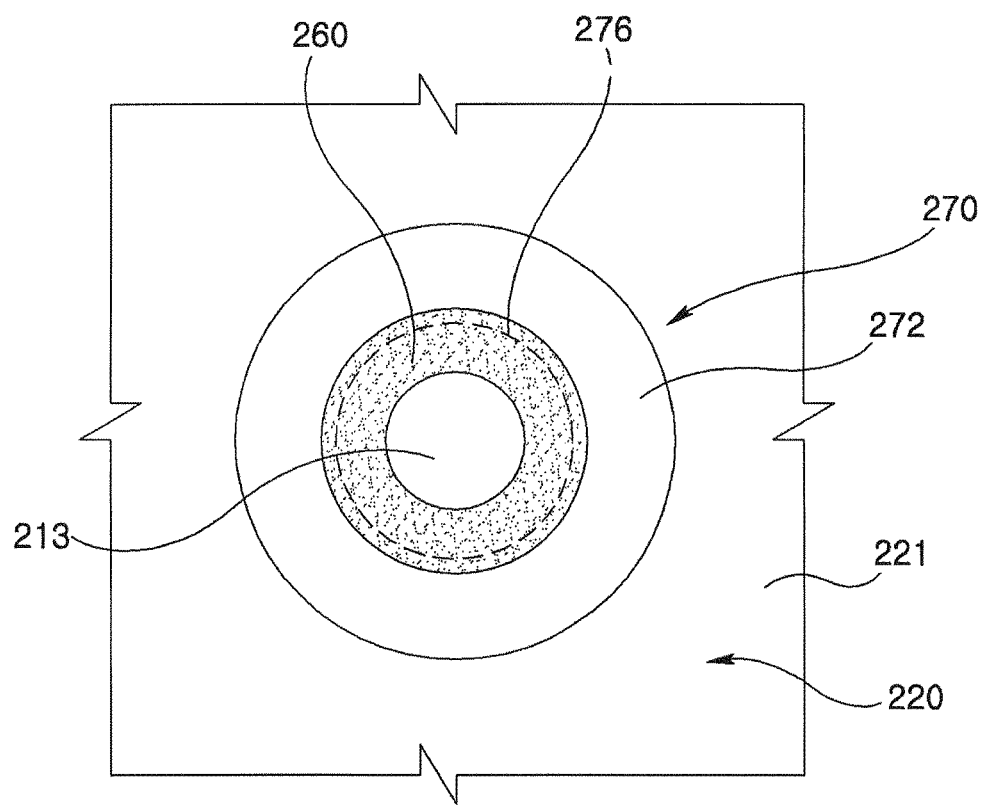
FIG. 3 is a rear view of a bearing housing, an adhesive member and a strength reinforcement member illustrated in FIG. 1.

FIG. 1 is a cross-sectional view of a spindle motor according to an exemplary embodiment of the present disclosure, FIG. 2 is an enlarged view of 'A' part in FIG. 1, and FIG. 3 is a rear view of a bearing housing, an adhesive member and a strength reinforcement member illustrated in FIG. 1.

Referring to FIGS. 1, and 3, a spindle motor (200) includes a bearing assembly (210), a base plate (220), a stator (230), a rotation shaft (240), a rotor (250), an adhesive member (260) and a strength reinforcement member (270). The spindle motor may further include a disk alignment unit (280).

The bearing assembly (210) includes a bearing housing (215) and a bearing (218). The bearing housing (215) includes a first floor plate (211), a first lateral plate (212), a second floor plate (213) and a second lateral plate (214).

The first floor plate (211) takes the shape of a doughnut, the first lateral plate (212) is extended from an upper edge of the first floor plate (211) to a direction facing an upper side, and the bearing housing (215) is formed for accommodating the bearing (218) by the first floor plate (211) and the first lateral plate (212).

The second floor plate (213) and the second lateral plate (214) is formed by protruding a center portion of the first floor plate (211) to a direction facing an external lateral surface from an inner lateral surface of the first floor plate (211). The second lateral plate (214) is connected to the first floor plate (211), the second lateral plate (214) is connected to the second floor plate (213). The first floor plate (211) and the second floor plate (213) are arranged in parallel.

In view of a shape, the first lateral plate (212) takes the shape of an empty hollow pillar having a first size, and the second lateral plate (214) takes the shape of an empty hollow pillar having a second size which is smaller than the first size.

The second floor plate (213) may take various shapes including a disk shape, an oval shape, a rectangular shape and a polygonal shape, when viewed in a top plan view. For example, the second floor plate (213) may take the shape of a disk.

Based on shapes of the first floor plate (211) and the second lateral plate (214), an adhesive member (260) is filled in a space formed by the first floor plate (211) and the second lateral plate (214) and a burring unit (225, described later) of the base plate (220), and the bearing housing (215) is coupled to the burring unit (225) of the base plate (220) by the adhesive member (260).

The bearing (218) takes the shape of a pipe formed with a rotation shaft hole (216). The bearing (218) is accommodated in an accommodation space formed by the first floor plate (211) and the first lateral plate (212), and press-fitted into the first lateral plate (212) of the hearing housing (215). In the present exemplary embodiment, the bearing (218) may include an oil impregnated sintered bearing.

Meanwhile, a washer (219) may be interposed between the bearing (218) and the first floor plate (211) for inhibiting the rotation shaft (240) from being separated or lifted from the bearing assembly (210).

The base plate (220) takes the shape of a plate, and the base plate (220) may be arranged thereon with a circuit substrate (227). The base plate (220) includes the burring unit (225) protruded at a predetermined height toward an inner lateral surface (222) facing an external lateral surface (221) of the base plate (220) through a burring process.

The burring unit (225) is press-fitted by an external lateral surface of the first lateral plate (212) of the bearing housing (215), and the bearing housing (215) including the bearing (218) is secured at the base plate (220).

The stator (230) includes a core (232) and a coil (234). The core (232) includes a plurality of iron pieces, each stacked on the other iron piece, and a center of the stacked iron pieces is formed with a through hole for being coupled to the first lateral plate (212) of the bearing housing (215). The coil (234) is wound on the core (232), a magnetic field is generated on the coil (234) by a current applied to the coil (234).

The rotation shaft (240) is rotatably inserted into the rotation shaft hole (216) of the bearing (218) of the bearing assembly (210). A bottom distal end of the rotation shaft (240) faces the second floor plate (213) of the bearing housing (215), and a thrust bearing (245) is interposed between the second floor plate (213) of the bearing housing (215) and the a bottom distal end of the rotation shaft (240) to allow the rotation shaft (240) to rotate at a high speed.

The rotor (250) is coupled to the rotation shaft (240) and rotates with the rotation shaft (240). The rotor (250) includes a yoke (252) and a magnet (254). The yoke (252) takes the shape of a disk, and a rotational center of the yoke (252) is formed with a yoke burring unit (253) coupled to the rotation shaft (240), and an edge of the yoke (252) is formed with a skirt unit (252a) so bent as to face the core (232) of the stator (230).

The magnet (254) is coupled to an inner lateral surface of the skirt unit (252a) of the yoke (252), and the magnet (254) faces the core (232) of the stator (230). The rotation shaft (240) is rotated by a rotational force generated by a magnetic field generated from the coil (234) wound on the core (232) and a magnetic field generated from the magnet (254).

The bearing housing (215) and the burring unit (225) of the base plate (220) are bonded by the adhesive member (260) to inhibit the bearing housing (215) from being disengaged from the burring unit (225) of the base plate (220) when a shock is applied to the bearing housing (215).

Meanwhile, there is a possibility of the bonding strength between the bearing housing (215) and the burring unit (225) of the base plate (220) being greatly decreased by the adhesive member (260), in a case volume of the adhesive member (260) and thickness of the adhesive member (260) are reduced to decrease the thickness of the spindle motor (200). In order to increase the adhesive force between the bearing housing (215) and the burring unit (225) of the base plate (220), a rear surface of the base plate (220) may be arranged with a strength reinforcement member (270).

Referring to FIGS. 2 and 3, the strength reinforcement member (270) includes a body (272) and a strength reinforcement unit (274). In the present exemplary embodiment, the strength reinforcement member (270) may be manufactured with a metal or a reinforced plastic.

The body (272) may take the shape of an opening-formed disk or ring, when viewed from a top plan view. The body (272) may be secured to a rear surface of the base plate (220) via an adhesive, a welding or a press-fitting. The opening of the body (272) is formed with a proper size to expose the adhesive member (260).

The strength reinforcement member (274) is formed at an inner lateral surface formed by the opening formed on the body (272). In the present exemplary embodiment, the strength reinforcement unit (274) includes a first reinforcement unit (275) and a second reinforcement unit (276).

The first reinforcement unit (275) is bent from the body (272) to a direction in parallel with that of the burring unit (225) of the base plate (220) and brought into contact with the burring unit (225). The first reinforcement unit (275) may be formed in a cylindrical shape, for example.

The second reinforcement unit (276) is bent from a distal end of the first reinforcement unit (275) to a direction in a parallel with that of the second floor plate (213) of the bearing housing (215), and takes the shape of a circular ring, when viewed from a top plan view.

The first reinforcement unit (275) and the second reinforcement unit (276) are arranged inside the adhesive member (260) in the present exemplary embodiment, and inhibit the bearing housing (215) from being moved or disengaged from the burring unit (225) of the base plate (220) when the adhesive member (260) is cured and a shock is applied to the bearing housing (215).

Figure 4:
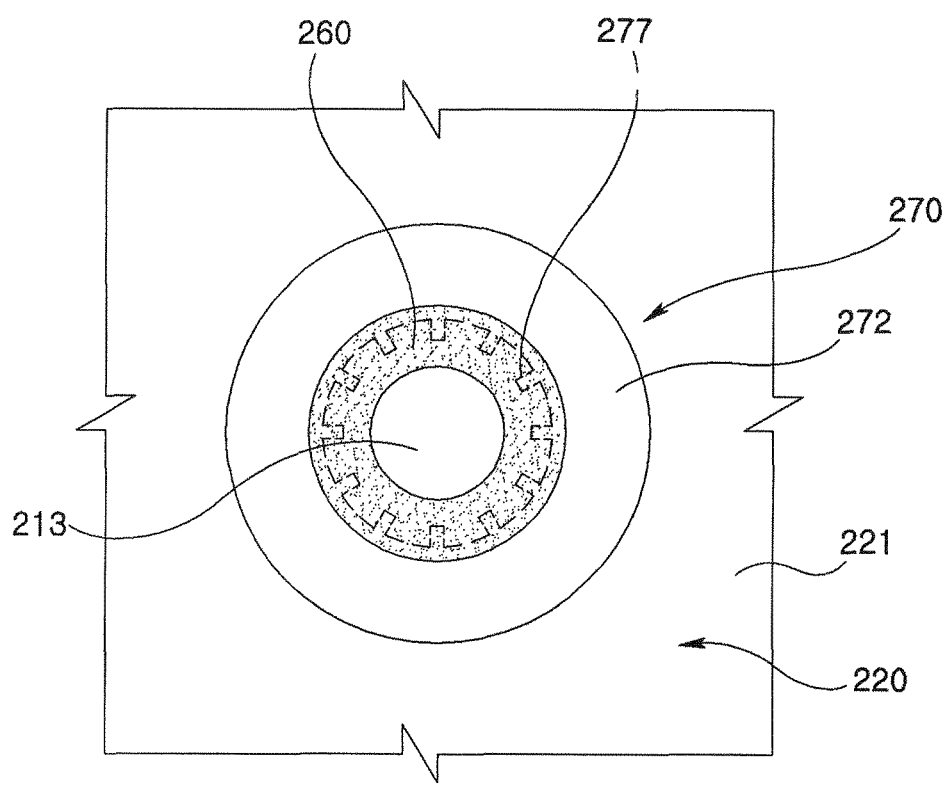
FIG. 4 is a plan view illustrating a strength reinforcement member according to another exemplary embodiment of the present invention.

FIG. 4 is a plan view illustrating a strength reinforcement member of spindle motor illustrated in FIG. 1 according to another exemplary embodiment of the present invention.

The strength reinforcement member of spindle motor illustrated in FIG. 4 has the substantially same structure as that of the strength reinforcement member of spindle motor illustrated in FIG. 3 except for the second reinforcement unit, such that redundant description to the like constituent elements is omitted, where like numbers refer to like elements throughout.

Referring to FIGS. 2 and 4, a strength reinforcement member (270) of a spindle motor (200) includes a body (272) and a strength reinforcement unit (274).

The strength reinforcement unit (274) includes a first reinforcement unit (275) and a second reinforcement unit (277). The second reinforcement unit (277) is connected to a distal end of the first reinforcement unit (275), where a plurality of second reinforcement units is intermittently formed along the first reinforcement unit (275).

The first and second reinforcement units (275, 277) are respectively arranged inside the adhesive member (260), and inhibit the bearing housing (215) from being moved or disengaged from the burring unit (225) of the base plate (220) when the adhesive member (260) is cured and a shock is applied to the bearing housing (215).

Although the present exemplary embodiment has illustratively described that a strength reinforcement (274) extended into the adhesive member (260) from the body (272) of the strength reinforcement unit (270) is twice bent, it should be apparent that the strength reinforcement unit arranged inside the adhesive member (260) may be bent once to be perpendicular to the body (272).

Figure 5:
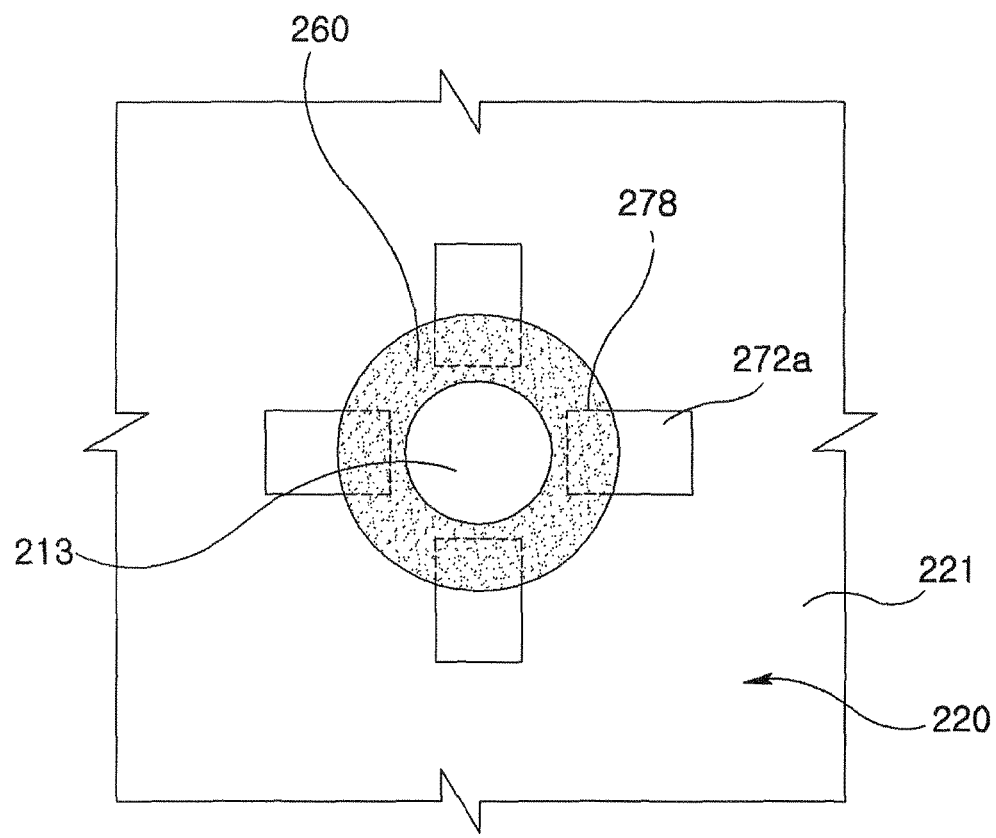
FIG. 5 is a plan view illustrating a strength reinforcement member according to still another exemplary embodiment of the present invention.

FIG. 5 is a plan view illustrating a strength reinforcement member of spindle motor according to still another exemplary embodiment of the present invention.

The spindle motor illustrated in FIG. 5 has the substantially same structure as that of the spindle motor illustrated in FIG. 1 except for the strength reinforcement unit, such that redundant description to the like constituent elements is omitted where like numbers refer to like elements throughout.

Referring to FIGS. 1 and 5, the strength reinforcement member (270) of the spindle motor (200) includes a body (272a) and a strength reinforcement unit (278).

At least two bodies (272a) are adhered to a bottom surface of the base plate (220), for example. The body (272a) is axially adhered about a center of the second floor plate (213) of the bearing housing (215). Four bodies (272a) are axially adhered to the bottom surface of the base plate (220) about the center of the second floor plate (213) of the bearing housing (215), for example.

The strength reinforcement unit (278) is extended from the body (272a) to be arranged inside the adhesive member (260). The strength reinforcement unit (278) arranged inside the adhesive member (260) may be bent at least once.

As apparent from the foregoing, the spindle motor according to the exemplary embodiments of the present disclosure has an industrial applicability and advantageous effect in that a strength reinforcement member is arranged inside an adhesive member securing a bearing housing and a base plate, and a body integrally formed with the strength reinforcement member is arranged at a bottom surface of the base plate to inhibit the bearing housing from being moved or disengaged from a burring unit of the base plate when a shock is applied from outside to the bearing housing.

Although embodiments have been described with reference to a number of illustrative embodiments thereof, it should be understood that numerous other modifications and embodiments can be devised by those skilled in the art that will fall within the spirit and scope of the principles of this invention. More particularly, various variations and modifications are possible in the component parts and/or arrangements of the subject combination arrangement within the scope of the disclosure, the drawing and the appended claims. In addition to variations and modifications in the component parts and/or arrangements, alternative uses will also be apparent to those skilled in the art.

What is claimed is:

1. A spindle motor, comprising:
   a bearing assembly including a bearing housing and a bearing accommodated in the bearing housing and formed with a rotation shaft hole, wherein the bearing housing includes a first floor plate having a doughnut shape, a first lateral plate integrally formed with the first floor plate and extended from an outside edge of the first floor plate to a direction facing an upper side of the motor, a second lateral plate integrally formed with the first floor plate and extended from an inside edge of the first floor plate to a direction facing a bottom side of the motor, and a second floor plate integrally formed with the second lateral plate and extended from the second lateral plate such that it is arranged in parallel with the first floor plate;
   a base plate integrally formed with a burring unit, wherein a part of the burring unit is coupled to a part of a periphery of the first lateral plate;
   a stator including a core coupled to the periphery of the first lateral plate and a coil wound on the core;
   a rotation shaft inserted into the rotation shaft hole of the bearing;
   a rotor including a yoke coupled to the rotation shaft and a magnet arranged on the yoke to face the core;
   a strength reinforcement member including a body fixed to a bottom surface of the base plate, and a strength reinforcement unit extended from the body;
   a first recess formed by the first floor plate, the second lateral plate, and the burring unit; and
   an adhesive member filling the first recess and formed from the first floor plate to a level of a bottom surface of the body;
   wherein the adhesive member includes a second recess, and a portion of the second recess faces downward away from the first floor plate; and
   wherein the strength reinforcement unit fills the second recess.

2. The spindle motor of claim 1, wherein the strength reinforcement unit includes a first reinforcement unit bent from the body in parallel with the burring unit, and a second reinforcement unit bent from the first reinforcement unit in parallel with the second floor plate, wherein the first and second reinforcement units are arranged inside the adhesive member.

3. The spindle motor of claim 1, wherein the strength reinforcement unit is bent at right angle from the body to be arranged inside the adhesive member.

4. The spindle motor of claim 1, wherein the reinforcement unit is bent at an obtuse angle from the body to be arranged inside the adhesive member.

5. The spindle motor of claim 1, wherein the body takes the shape of a circular ring when viewed in a top plan view, and the strength reinforcement unit is extended from an inner circumferential surface of the body in a ring shape to be arranged inside the adhesive member.

6. The spindle motor of claim 1, wherein the body takes the shape of a circular ring when viewed in a top plan view, and a plurality of the second strength reinforcement units is intermittently extended from an inner circumferential surface of the body to be arranged inside the adhesive member.

7. The spindle motor of claim 1, wherein the body is fixed to the base plate by any one means of an adhesive, a welding or a press-fitting.

* * * * *